US012401682B2

(12) United States Patent
Brecl

(10) Patent No.: US 12,401,682 B2
(45) Date of Patent: Aug. 26, 2025

(54) SYSTEMS AND METHODS FOR CONFIGURING ENCAPSULATION TUNNELS BASED ON DYNAMIC CAPACITY CHECKS

(71) Applicant: Level 3 Communications, LLC, Broomfield, CO (US)

(72) Inventor: Peter Brecl, Highlands Ranch, CO (US)

(73) Assignee: Level 3 Communications, LLC, Denver, CO (US)

( * ) Notice: Subject to any disclaimer, the term of this patent is extended or adjusted under 35 U.S.C. 154(b) by 289 days.

(21) Appl. No.: 18/160,476

(22) Filed: Jan. 27, 2023

(65) Prior Publication Data
US 2023/0300167 A1 Sep. 21, 2023

Related U.S. Application Data

(60) Provisional application No. 63/269,662, filed on Mar. 21, 2022.

(51) Int. Cl.
| | |
|---|---|
| *H04L 9/40* | (2022.01) |
| *H04L 12/46* | (2006.01) |
| *H04L 61/5007* | (2022.01) |

(52) U.S. Cl.
CPC ...... *H04L 63/1441* (2013.01); *H04L 12/4633* (2013.01); *H04L 61/5007* (2022.05); *H04L 63/0236* (2013.01); *H04L 63/029* (2013.01)

(58) Field of Classification Search
CPC ............ H04L 63/1441; H04L 12/4633; H04L 61/5007; H04L 63/0236; H04L 63/029; H04L 2101/668
See application file for complete search history.

(56) References Cited

U.S. PATENT DOCUMENTS

| | | | | |
|---|---|---|---|---|
| 9,398,043 | B1* | 7/2016 | Yang | H04L 63/1441 |
| 2014/0229766 | A1* | 8/2014 | Campbell | G06F 11/3037 |
| | | | | 714/15 |
| 2014/0373140 | A1* | 12/2014 | Waters, Jr. | H04L 63/1458 |
| | | | | 726/22 |
| 2016/0182542 | A1* | 6/2016 | Staniford | H04L 63/1458 |
| | | | | 726/23 |
| 2016/0241590 | A1* | 8/2016 | Smith | H04L 67/1001 |
| 2017/0237767 | A1* | 8/2017 | George | H04L 63/1416 |
| | | | | 726/23 |
| 2021/0084067 | A1* | 3/2021 | Smith | H04L 61/2503 |
| 2021/0185083 | A1* | 6/2021 | Azaria | H04L 63/1458 |
| 2022/0201033 | A1* | 6/2022 | Shapira | H04L 63/029 |

\* cited by examiner

*Primary Examiner* — Joe Chacko

(57) ABSTRACT

An automatic provisioning and configuration system for threat mitigation may be provided. Hardware and software resources may be automatically configured to designate a return path for forwarding clean data packets to a target network. A return path from a scrubbing center to the target network may be selected and configured, for example, based on the geographic location of the scrubbing center and information regarding available capacity of the return path to the target network, among other information. The system may also perform a set of dynamic checks to determine whether one or more scrubbing centers have capacity (and/ or are likely to continue to have capacity) to provide an encapsulation tunnel between the scrubbing center and the target network for clean return traffic.

18 Claims, 15 Drawing Sheets

Clean Traffic Return Paths (CTRPs)

⊙ Clean Traffic Return Path 2    Move to ⌄   🗑   ⌄

⊙ Clean Traffic Return Path 3    Move to ⌄   🗑   ⌄

⚠ Clean Traffic Return Path 4    Move to ⌄   🗑   ⌃

+ ADD CTRP

Alias *
[Clean Traffic Return Path 4]

Clean Traffic Return Type * ⓘ — 402
[GRE]

Autonomous System Number (ASN) * ⓘ
[1234]

Customer GRE Source IP Address * ⓘ
[233.252.0.248]

Lumen GRE Location * ⓘ    — 404
[Washington DC, NA   ⌄]

Frankfurt, EMEA
    Hong Kong, APAC
    Los Angeles, NA
    Sao Paulo, LATAM
    Singapore, APAC
    Washington DC, NA    — 406

— 400

Lumen Internet Direct

Clean Traffic Return Bandwidth * ⓘ
[100 Mbps   ⌄]

SUBMIT

+ ADD CTRP

FIG. 4

Clean Traffic Return Paths (CTRPs)

⊘ Clean Traffic Return Path 2    Move to ∨   🗐   ∨

⊘ Clean Traffic Return Path 3    Move to ∨   🗐   ∨

⚠ Clean Traffic Return Path 4    Move to ∨   🗐   ∧

Alias *

| Clean Traffic Return Path 4 |

Autonomous System Number (ASN) * ⓘ

| 1234 |

Lumen GRE Location * ⓘ

| Washington DC, NA   ∨ | ⟵ 500

Clean Traffic Return Type * ⓘ

| GRE | | Lumen Internet Direct |

Customer GRE Source IP Address * ⓘ

| 233.252.0.248 |

Clean Traffic Return Bandwidth * ⓘ

| 100 Mbps   ∨ |
| 100 Mbps |
| 200 Mbps |
| 500 Mbps |  ⟵ 502
| 1 Gbps |
| 2 Gbps |

[+ ADD CTRP]

[SUBMIT] ⟵ 504

| | Clean Traffic Return Path 3 | Move to ⌄ |
|---|---|---|
| ⚠ | Clean Traffic Return Path 4 | Move to ⌄ |

Alias*  
[Clean Traffic Return Path 4]

Clean Traffic Return Type* ⓘ  
[ GRE ] [ Lumen Internet Direct ] — 402

Internet Service Selection ⓘ  
[🔍]

| | Product Id | Service Id | Service Location | Internet Bandwidth |
|---|---|---|---|---|
| ○ | 441406080 | 334474280 | 240 EAST INDIA DOCK RD East India Dock House Floor 1 Room COLO LONDON LONDON E14 9YY GBR | 1 Gbps |
| ○ | 440252831 | 330786257 | 2 BUCKINGHAM AVE Ld4/Ld5 Datacentres Floor GND Room MC01 SLOUGH SL1 4NB GBR | 100 Mbps |
| ○ | 442084561 | 336515920 | 36 JAMESTOWN RD THE ICEWORKS LONDON LONDON NW1 7BY GBR | 500 Mbps |
| ○ | 441447761 | 334602178 | | 1 Gbps |
| ○ | 441821771 | 335725856 | RÜSSELSHEIMER STR 22 Floor GND Room MMR FRANKFURT AM MAIN HESSE 60326 DEU | 10 Gbps |

⟨ 2 of 10 ⟩

46 results

[ SUBMIT ]

| | Product Id | Service Id | Service Location | Internet Bandwidth |
|---|---|---|---|---|
| ○ | 441406080 | 334474280 | 240 EAST INDIA DOCK RD East India Dock House Floor 1 Room COLO LONDON LONDON E14 9YY GBR | 1 Gbps |
| ○ + | 440252831 | 330786257 | 2 BUCKINGHAM AVE Ld4/Ld5 Datacentres Floor GND Room MC01 SLOUGH SL1 4NB GBR | 100 Mbps |
| ○ − | 442084561 | 336515920 | 36 JAMESTOWN RD THE ICEWORKS LONDON LONDON NW1 7BY GBR | 500 Mbps |

ⓘ The selected circuit doesn't currently qualify for Lumen Internet Direct, please select a different circuit from the internet service selection list. You can refer to the *FAQ Documentation* to learn more about the qualification criteria.

| ○ | 441447761 | 334602178 | | 1 Gbps |
| ○ | 441821771 | 335725856 | RÜSSELSHEIMER STR 22 Floor GND Room MMR FRANKFURT AM MAIN HESSE 60326 DEU | 10 Gbps |

Clean Traffic Return Path 4

Alias *
[Clean Traffic Return Path 4]

Clean Traffic Return Type * ⓘ
[ GRE ] [ Lumen Internet Direct ]

Internet Service Selection ⓘ
[🔍]

Move to ∨

46 results    ‹ 2 of 10 ›

Clean Traffic Return Path 3                                      Move to ⌄

Alias *
Clean Traffic Return Path 3

Clean Traffic Return Type * ⓘ
GRE                    Lumen Internet Direct

Internet Service Selection ⓘ

| Product Id | Service Id | Service Location | Internet Bandwidth |
|---|---|---|---|
| — 442614375 | 338116939 | 60 HUDSON ST Floor 1 Room MMR1 NEW YORK NEW YORK 10013 USA | 10 Gbps —1004 |
| WAN IP —1000 | Routing Protocol | | ASN |
| 203.0.133.2/30 | BGP —1002 | | 10753 |

1 results     ⟨ 1 of 1 ⟩

Unprotected Internet Peer Prefixes ⓘ
Optionally select one or more Peer Prefixes to move them to the Customer Protected IP Prefix list (above) for protection

🔍

☑ Peer Prefix —1008        Match Type

*All Peer Prefixes are protected for this internet service.*

Clean Traffic Return Bandwidth ⓘ —1006
2 Gbps ⌄

PROTECT SELECTED PEER PREFIXES

☐ Monitor for attacks using Lumen Network

Customer Router Configuration Details                    UPDATE

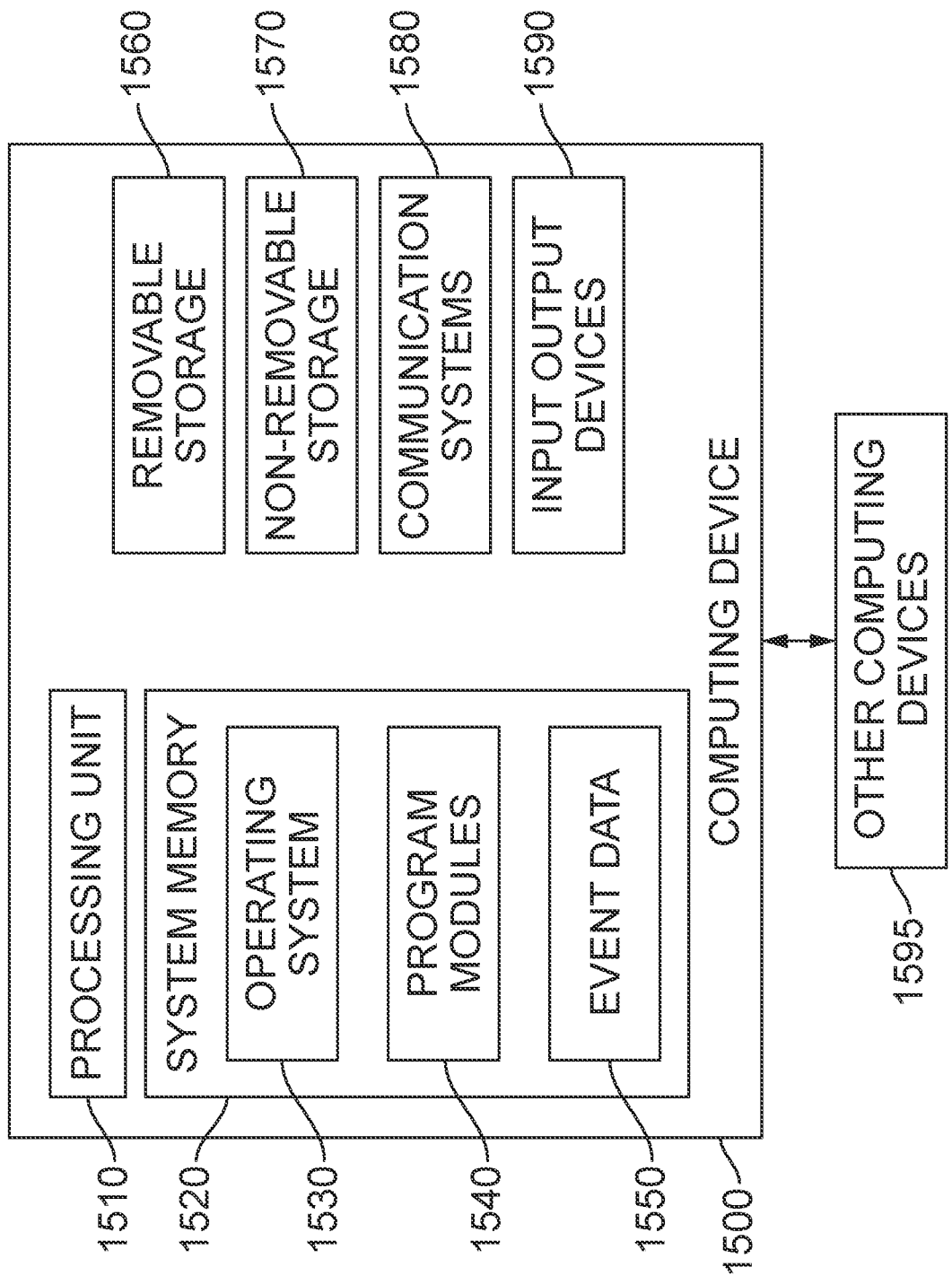

SYSTEMS AND METHODS FOR CONFIGURING ENCAPSULATION TUNNELS BASED ON DYNAMIC CAPACITY CHECKS

CROSS-REFERENCE TO RELATED APPLICATIONS

This application claims the benefit of U.S. Provisional Application No. 63/269,662 filed Mar. 21, 2022, entitled "Systems and Methods for Configuring Encapsulation Tunnels based on Dynamic Capacity Checks," which is incorporated herein by reference in its entirety.

FIELD

One or more aspects of embodiments according to the present disclosure relate to mitigating malicious network threats, and more particularly, to automatically configuring an encapsulation tunnel based on dynamically determined capacity of a router that is to forward clean network packets.

BACKGROUND

Communications networks have increased in complexity. For example, large communication networks may process millions of queries (or more) per second. Malicious actors routinely attempt to circumvent security measures of communications networks and/or cause communications network failures. For example, denial of service (DoS) and distributed denial of service (DDoS) attacks have become commonplace. DDoS attacks attempt to overwhelm network components (such as domain name system (DNS) servers) or applications by flooding the network components or applications with superfluous requests in an attempt to overload the network, network components, or applications and prevent legitimate requests from being fulfilled. In a DDoS attack, the incoming traffic that floods the victim's network components or applications may originate from different sources. In this scenario, simply blocking a single source may not stop the attack.

The above information disclosed in this Background section is only for enhancement of understanding of the background of the present disclosure, and therefore, it may contain information that does not form prior art.

SUMMARY

In examples, the present application discloses a method for mitigating threats in a network, comprising: receiving, from a computing device, a first selection of a first threat mitigation system for protecting a target service; dynamically identifying available capacity of the threat mitigation system to deliver traffic to the target service; sending an indication of the available capacity to the computing device; receiving, from the computing device, a second selection of a desired capacity; and automatically configuring, in response to the second selection, a first encapsulation tunnel for transmitting packets to the target service based on the desired capacity.

In another example, the present application discloses a method for mitigating threats in a network, comprising: causing display of a plurality of scrubbing centers of a threat mitigation system; receiving, from a computing device, a first selection of a particular scrubbing center of the plurality of scrubbing centers for protecting a target service; dynamically calculating available capacity of at least the particular scrubbing center to deliver traffic to the target service; causing display of one or more bandwidth options for an encapsulation tunnel originating from the particular scrubbing center, wherein the one or more bandwidth options is at or below the available capacity; receiving, from the computing device, a second selection of a desired bandwidth; automatically configuring, in response to the second selection, a first encapsulation tunnel with the desired bandwidth for transmitting packets to the target service; receiving, by the first scrubbing center a network packet directed to the target service; determining, by the first scrubbing center, whether to forward the network packet to the target service; and in response to determining to forward the network packet to the target service, transmitting the packet to the target service via the encapsulation tunnel.

In another example, the present application discloses a system comprising at least one processor and memory, operatively connected to the at least one processor, and storing instructions that, when executed by the at least one processor, cause the system to perform a method. In examples, the method comprises: receiving, from a computing device, a first selection of a first threat mitigation system for protecting a target service; dynamically identifying available capacity of the threat mitigation system to deliver traffic to the target service; sending an indication of the available capacity to the computing device; receiving, from the computing device, a second selection of a desired capacity; and automatically configuring, in response to the second selection, a first encapsulation tunnel for transmitting packets to the target service based on the desired capacity.

These and other features, aspects and advantages of the embodiments of the present disclosure will be more fully understood when considered with respect to the following detailed description, appended claims, and accompanying drawings. This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

FIGS. 4-6 depict one or more graphical user interface providing options for setting up a return path for forwarding clean packets to a target service according to one embodiment;

FIGS. 8-11 depict one or more graphical user interface for allowing configuration of threat mitigation services in response to receiving selection of a provider Internet circuit option from an administrator according to one embodiment;

FIG. 15 is a block diagram of a computing device according to one embodiment.

DETAILED DESCRIPTION

Figure 1:
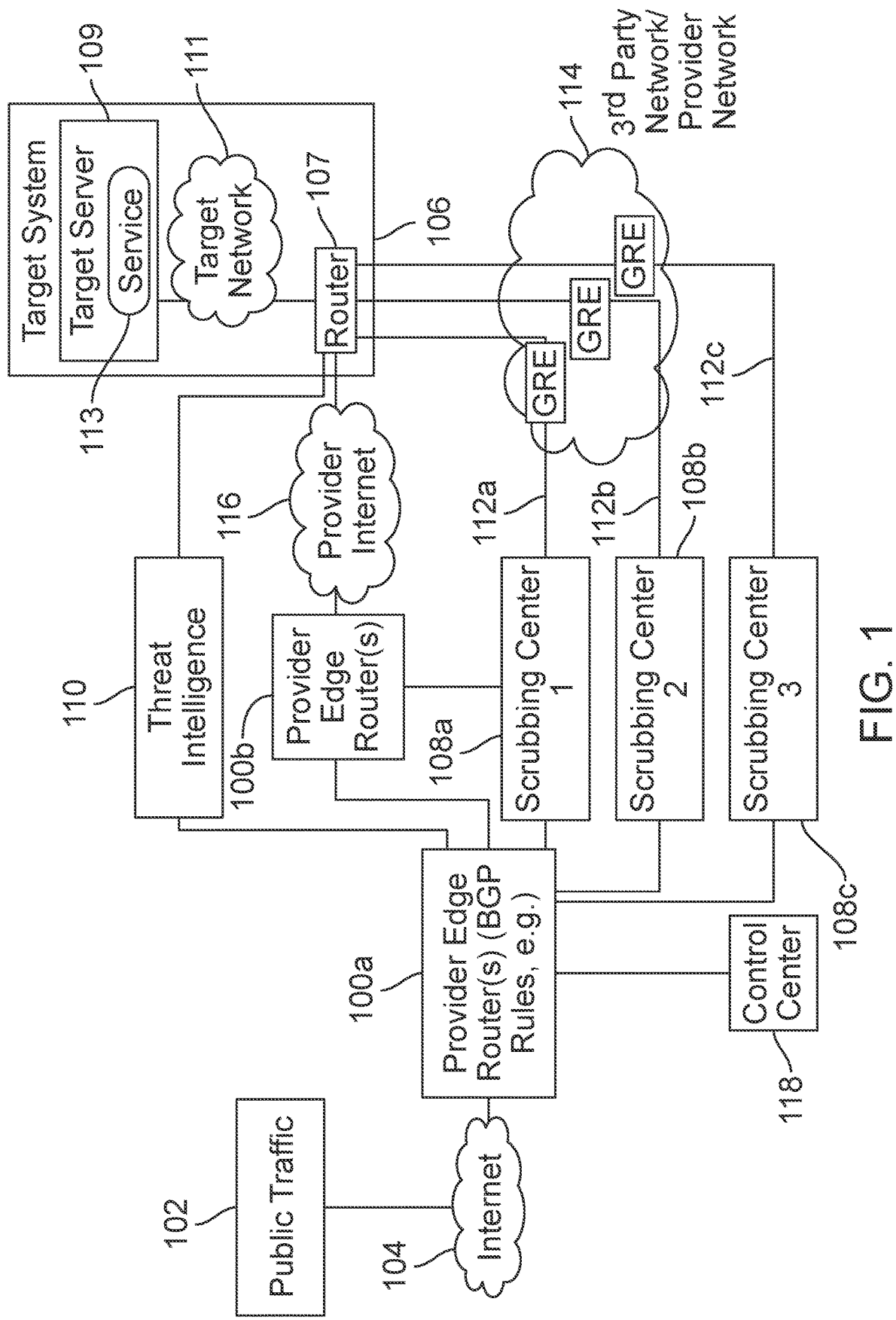
FIG. 1 is a block diagram of an example networking environment for mitigating network threats according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

DoS and DDoS attacks (collectively referred to herein as DDoS attacks) that attempt to overwhelm an organization's network components (such as domain name system (DNS) servers, web or content servers, and the like) have become commonplace. When a DDoS attack is launched, a number of attacking machines may send, to a target service, a high volume of requests or specially crafted requests for service that may, if suitable measures are not taken, overwhelm the target service and degrade its ability to service legitimate requests. In a DDoS attack, the attacking machines may spoof multiple IP addresses at the same time to mask the attacker's location, making it difficult to mitigate the attack.

According to one mechanism for mitigating DDoS attacks, incoming and outgoing traffic for an organization may be routed through a scrubbing center that attempts to identify malicious packets and remove those packets before they reach a targeted organization's network or device. In this regard, the target organization/customer seeking to protect its network from DDoS attacks may request threat mitigation services from a threat mitigation system that includes the scrubbing center. The request may include an indication of the capacity of the scrubbing center's resources to be devoted to the customer to return clean data packets to the target's network. The selected capacity may be, for example, bandwidth of the return path for the clean traffic. Thus, it may be desirable for the scrubbing center to dynamically determine its available capacity and provide such information to the customer for selection.

Once the customer has identified the options for the threat mitigation service, it may be desirable to automatically provision and/or configure (collectively referred to as configure) hardware and software resources to provide the service. The configured hardware and software resources may relate to a return path for forwarding clean data packets to the target's network. The automatic configuring may allow a quicker setup of the threat mitigation service for faster protection of the target's services from DDoS attacks.

In one embodiment, the return path from the scrubbing center to the target service, for returning clean traffic, is over a network via encapsulation tunnels, such as, for example, Generic Routing Encapsulation (GRE) tunnels. Although GRE is used as an example, embodiments of the present disclosure are not limited thereto, and may include other forms of encapsulation.

In one embodiment, the customer may access a control center to get information on one or more scrubbing centers that the customer may select to protect its network. The information may include, for example, the geographic location of the scrubbing center, and information on available capacity of the return path to the target service to return clean/legitimate packets that have been examined by the scrubbing center.

In one embodiment, the scrubbing center includes a scrubbing controller that dynamically calculates, in response to a request, the current available capacity of the scrubbing center. The available capacity may be determined for example, based on the scrubbing equipment deployed at the scrubbing center, the number of GRE tunnels already configured on the scrubbing equipment, and/or predicted utilization of the configured tunnels. The calculated capacity may be sent for display on a computing device as the maximum capacity that the customer may select to configure the return path for its clean traffic.

In one embodiment, the customer of a network services provider selects an Internet circuit/network/service to which the customer is already subscribed, as the return path for the clean traffic. In this regard, the control center may provide a list of Internet circuits already used by the customer to provide its services via the network services provider. The customer may select one of the Internet circuits as the circuit to be used for the return traffic.

In one embodiment, a control center performs a set of dynamic checks to determine whether one or more of the Internet circuits are eligible for use for the return traffic. The check may include, for example, checking whether the circuit is a proper/qualified circuit, whether the equipment used by the circuit (e.g., edge router) and/or target is a proper/qualified equipment, whether the target advertises its address space to the Internet on the circuit, and/or the like. If a particular Internet circuit satisfies the checks, the customer may select the particular circuit as the return path for forwarding clean traffic to the target service.

In one embodiment the control center provides a list of network prefixes that are advertised on the particular Internet circuit using, for example, a Border Gateway Protocol (BGP). The administrator may select to protect one or more of the network prefixes using the threat mitigation system. In one embodiment, in response to the selection of one or more of the network prefixes, the control center automatically configures a threat mitigation service for the selected network prefixes. The configuring may include, for example, configuring a router of the threat mitigation system to send clean network packets of the customer, to the particular Internet circuit. The configuring may also include, for example, providing instructions to a target router to cause it to receive the forwarded clean traffic via the particular Internet circuit. For example, if the target router advertises its IP address space using BGP, the control center may automatically transmit a message to the target router, or an intermediate system that manages the target router, to include a particular community string to the BGP advertisement to the scrubbing centers.

FIG. 1 is a block diagram of an example networking environment for mitigating network threats according to one embodiment. The networking environment may include any type of telecommunications network that utilizes IP addresses for connecting one or more components of the network.

In one embodiment, the networking environment includes a provider network that includes one or more provider edge (PE) routers 100a, 100b (collectively referred to as 100) for providing entry points into the provider network. For example, an ingress PE router (e.g., PE router 100a) may be configured to receive public traffic 102 over the public Internet 104, determine the traffic's destination IP address, determine a route for the traffic, and forward the traffic to an egress PE router (e.g., PE router 100b), for delivery to a target system 106 based on the determined route.

The PE routers 100 may advertise through a BGP session (or some other routing protocol announcement or advertisement), routes serviced by the router. For example, the PE routers 100 may provide a BGP advertisement that indicates that the target service 106 may be accessed through the ingress and egress PE routers 100a, 100b. In response to the advertisement, public traffic 102 directed to the target system 106 may be routed to the system by the PE routers 100.

In one embodiment, the target system 106 includes one or more target routers 107 operatively coupled to one or more target servers 109 over a target network 111. The target network 111 may be, for example, any Internet Protocol (IP)-based communication network configured to transmit and receive communications using one or more telecommunications components. In one embodiment, the target server 109 hosts a target computing service 113 (target service). The target service 113 may be a web page, application programming interface (API), or another computing application configured to process requests and provide content in response to the requests. For example, if the target server 109 is a content server, the provided content may be images, text, audio, video, web pages, computer programs, documents, files, and/or the like. If the target server 109 is a domain name system (DNS) server, the provided content may be IP addresses or domain information.

In one embodiment, the public traffic 102 includes a request directed to the target system 106. In some cases, a hacker may send malicious requests to the target system 106 to attempt to overload the system and prevent legitimate requests from being fulfilled. The malicious requests may take the form of a distributed denial of service (DDoS) attack that floods the target system 106 with superfluous requests.

In an effort to counter against DDoS attacks, an administrator of the target system 106 (also referred to as a customer) may purchase a threat mitigation service to clean/scrub network packets directed to the target system that are identified to be a threat. The threat mitigation service, e.g., one or more scrubbing centers 108a-108c (collectively referenced as 108), may cooperate with threat intelligence service 110 to mitigate threats identified by the threat intelligence service 110.

In one embodiment, the threat intelligence service 110 determines whether data packet traffic should be redirected to the scrubbing centers 108. In this regard, the threat intelligence service 110 may be configured to collect traffic information directed to the target system 106, and identify threats. When, based on the collected traffic information, the threat intelligence service 110 determines that traffic directed to the target system 106 meets a particular threat profile, the threat intelligence service may notify the scrubbing centers 108 so that packets intended for the target system 106 may be rerouted through one of the scrubbing centers to attempt to combat the attack. In one embodiment, the rerouting is through a BGP advertisement/announcement that includes route information to redirect the public traffic 102 intended for the target system 106, to the scrubbing center 108.

The threat profile that causes the redirecting of the public traffic 102 to the scrubbing center 108 may include, for example, a sudden increase in queries received from a particular source IP address to a particular destination IP address of the target system 106. In other examples, the threat profile may comprise information about the port from which messages are sent or on which messages are received. In other examples, the threat profile may comprise information about a particular destination domain in combination with some other aspect of the query. Other examples of threat measures are possible. For example, a threat measure may comprise a percentage of a certain type of traffic meeting a threat profile.

In one embodiment, the threat intelligence service 110 is hosted in a provider equipment. For example, the threat intelligence service 110 may be hosted in a PE router 100, scrubbing center 108, and/or the like. In some embodiments, some or all of the threat intelligence service 110 is distributed. For example, portions of the threat intelligence service 110 may be instantiated in one or more pieces of provider equipment and/or in equipment associated with the target system 106. In other examples, the threat intelligence service 110 may be provided by a third party.

In one embodiment, in response to the threat intelligence service 110 detecting an attack, the public traffic 102 intended for the target system 106 is rerouted to the scrubbing center 108 configured to protect the target system 106. In one embodiment, the scrubbing center 108 may be one of various scrubbing centers that provide threat mitigation services from different geographic locations. In one example, the scrubbing center 108 that is configured to protect the target system 106 may be one that is nearest to the target system 106. In another example, the scrubbing center 108 that is configured to protect the target system 106 may be one that is nearest from a network distance and associated network performance, such as latency, to the target system 106. In other examples, the scrubbing center 108 that is configured to protect the target system 106 is not one that is closest to the target system 106 but has the necessary capacity to provide the mitigation service to target system 106. In yet other examples, the various scrubbing centers 108 may be deployed as virtual machines in one or more pieces of equipment of the provider network, such as, for example, on one or more PE routers 100. In examples, particular geographic regions may be assigned to the virtualized scrubbing centers for protecting target systems 106 located in the assigned geographic regions.

In one embodiment, the scrubbing center 108 selected to receive traffic directed to the target system 106 examines some or all of the received packets to determine which packets are clean/legitimate and which are suspect/malicious. The malicious packets may be dropped to prevent them from overwhelming the target system 106. The clean packets may be forwarded to the target system 106.

In one embodiment, the clean packets are transmitted to the target system 106 via a dedicated encapsulation tunnel 112a-112c (collectively referenced as 112) configured between a router of the selected scrubbing center 108 and the target router 107 of the target system 106. The encapsulation tunnel may be, for example, a GRE tunnel created to encapsulate traffic carried across a data communications network 114. In examples, the data communications network 114 may include a non-provider, third party network, or even provider network.

In returning a clean packet via the encapsulation tunnel 112, the clean packet may be placed inside a second packet (encapsulating packet). For example, the clean packet may be placed in a payload section of the encapsulating packet. The header information for the encapsulating second packet may specify the endpoints of the tunnel as the source and destination addresses. The second packet may then be transmitted through the tunnel to the destination address. The target router 107 receiving the second packet may extract the clean packet from the data portion of the second packet. The target router 107 may then route the clean packet to the intended destination of the target system via the target network 111.

In one embodiment, instead of returning the clean packet via an encapsulation tunnel 112, the packet may be returned over a provider Internet circuit 116 that does not traverse any third-party networks. The provider Internet circuit 116 may be one already used by the target system 106 for receiving the public traffic 102 delivered via the PE routers 100, and providing content/data in response. In one embodiment, a dynamic check is made of provider Internet circuits 116 subscribed to by the customer for determining whether one or more of the Internet circuits 116 are qualified for use for the return traffic.

In one embodiment, the networking environment includes a control center 118 that is accessible to an administrator of the target system 106. Although the control center 118 is depicted in FIG. 1 as a separate system, the various embodiments are not limited thereto, and the control center 118 may form part of one or more scrubbing centers 108, threat intelligence service 110, or another element of the provider equipment of the networking environment.

In one embodiment, the administrator accesses the control center 118 over the Internet 104 using a computing device (e.g., desktop, laptop, smart phone, or a server utilizing APIs for communication, or the like). The administrator may access the control center 118 to configure and manage threat mitigation services to mitigate against malicious network attacks directed to the target system 106.

In one embodiment, the control center 118 provides a graphical user interface (GUI) with which the administrator may interact to configure different parameters of the threat mitigation service. The interface may take forms other than GUI, such as API interface, or similar. The GUI may help simplify the configuration process and help expedite the setting up of the service to allow the service to be delivered quickly. For example, the GUI may allow the administrator to select the type of return path to use to send the clean traffic from a scrubbing center 108 to the target system 106. In one embodiment, the administrator selects the return path to be either the encapsulation tunnel 112 or the provider Internet circuit 116.

In response to selecting the encapsulation tunnel 112 as the return path, the GUI may allow the administrator to select one of the scrubbing centers 108 as a source endpoint for the tunnel. The administrator may select an optimal scrubbing center 108 based on one or more criteria. For example, the optimal scrubbing center 108 may be one that is geographically closest to the target system 106, one that provides best performance, such as lowest latency, and/or one that can support a tunnel of a desired capacity.

In one embodiment, the GUI obtains a dynamically computed capacity value from each of the scrubbing centers 108. The capacity value may be indicative of a maximum size/bandwidth of the encapsulation tunnel 112 that may be generated for the customer from the scrubbing center 108. The administrator may select a desired capacity for the encapsulation tunnel 112 based on the available capacity of the scrubbing center. For example, if the maximum available capacity of a scrubbing center is 2 Gbps, the administrator may choose to purchase all or a subset of the maximum available capacity for the encapsulation tunnel 112. Different scrubbing centers 108 may have different available capacities based on, for example, the network card(s) used by the router(s) at the scrubbing center 108, a number of existing encapsulation tunnels configured on the router(s), and/or predicted usage of the existing tunnels.

In some embodiments, the selection of the optimal scrubbing center 108 is automatic. Automatic selection may be desirable, for example, when the scrubbing centers 108 are virtual machines hosted on a PE router 100. The control center 108 may select one of the virtual machines based on allocated bandwidth, latency, and/or other performance factors.

Even when the scrubbing centers 108 are not virtual machines and are real/physical scrubbing centers 108 with physical equipment in different geographic locations, the control center 118 may automatically determine a most optical scrubbing center 108 from the various scrubbing centers 108. A determination that a scrubbing center 108 is optimal may be based on geographic proximity of the various scrubbing centers 108 to the geographic location of the target system 106. Other network considerations such as bandwidth and latency may also be considered in determining that a physical scrubbing center is optimal. In addition, the control center 118 may determine a particular piece of equipment (e.g., a router) at the optimal scrubbing center 108 that is most preferable/optimal based on load balancing, availability of ports on that equipment, historic and predicted trends of capacity utilization on that equipment, etc.

In one embodiment, the control center transmits a signaling message based on the selection of the particular scrubbing center and the desired capacity, for automatically configuring the tunnel for the target system 106. Automatic configuration may entail, for example, configuring the source end (e.g., source router) of the tunnel originating from the selected scrubbing center 108, and the destination end (e.g., destination router) of the tunnel ending at the target system 106. For example, the IP addresses of the source and destination ends of the tunnel may be configured in a source router of the selected scrubbing center 108. In one embodiment, the IP addresses of the source and destination ends are also automatically configured in the target router 107 of the target system 106. The automatic configuration may expedite the setting up of the threat mitigation services, and shorten the time and effort generally required for manual configuration.

In the embodiment where the administrator selects the provider Internet circuit 116 as the return path, the control center 118 may retrieve and cause the user's equipment to display all the Internet circuits that are currently associated with the target system 106. The Internet circuits may be identified, for example, based on an identifier of the target organization (i.e., the customer associated with the target system 106). In one embodiment, the control center 118 first filters out the Internet circuits that fail to qualify as the return path and causes to be displayed only the Internet circuits that qualify. In other examples, the control center 118 may cause all Internet circuits of the network services provider that are associated with the target organization to be displayed, and the qualification of that particular circuit may be performed only after the circuit is selected for potential use as the return path for clean traffic. The qualification determination may be based on rules set by the network services provider. For example, the rules may check for the type of Internet circuit, type of equipment/routers used by the circuit, type of routing protocol used by the Internet circuit, address space configured on the Internet circuit, and/or type of equipment of the target system 106 that uses the Internet circuit.

In one embodiment, the administrator selects the Internet circuit 116 that meets the qualification criteria as the return path for transmitting clean packets. In response to selecting the Internet circuit 116, the control center may retrieve information on the selected circuit for configuring threat mitigation services for the peer IP prefixes associated with the selected circuit. The retrieved information may include, for example, the public IP address to be used to forward the clean packets, bandwidth of the Internet circuit 116, type of routing protocol associated with the Internet circuit 116, advertised IP address prefixes, and/or the like.

In one embodiment, the administrator may select one or more of the advertised IP address prefixes to protect using the threat mitigation services of the provider. The selected IP address prefixes may then be included in a list of protected IP addresses for the target system 106. In one embodiment, the selected IP address prefixes are provided to the threat intelligence service 110 for adding into a list of protected IP addresses for the target organization.

In one embodiment, the retrieved information on the selected Internet circuit 116 is used to automatically select and/or configure the scrubbing center 108 for providing scrubbing services for the protected IP addresses. The selection of the scrubbing center may be automatic (e.g., by the control center 118) based on one or more network factors, including geographic proximity, capacity, latency, and/or the like. In some embodiments, the administrator may manually select the specific scrubbing center 108 to use based on the same or different considerations.

The configuring of the scrubbing center 108 may include, for example, configuring a router of the scrubbing center with an upper bandwidth limit for forwarding the clean data packets. The upper bandwidth limit may be selected, for example, by the administrator. The configuration may also entail updating a routing table of the router of the selected scrubbing center 108. In the example where the target router 107 advertises route information via BGP advertisements, the routing table may be updated based on establishing a BGP session with the target router 107. The advertised route may include a BGP community for the protected IP addresses to allow the packets with the IP prefixes to be transmitted via the selected Internet circuit 116.

Figure 2:
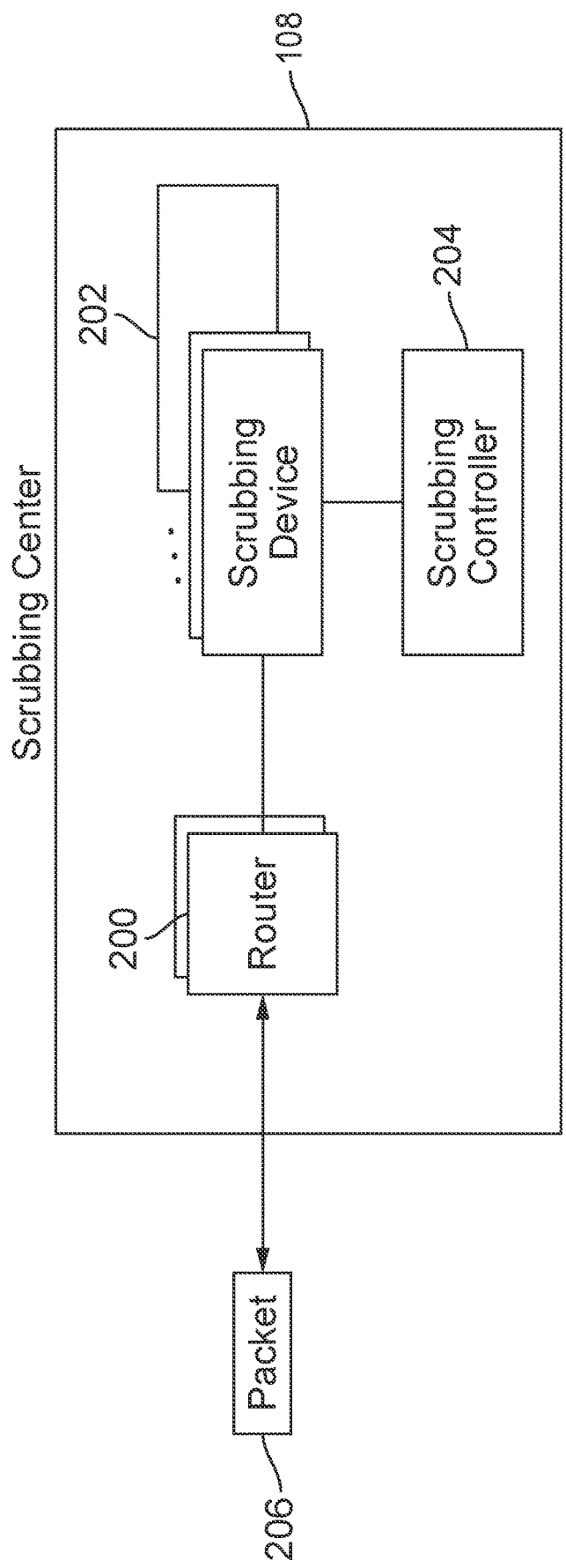
FIG. 2 is a block diagram of a scrubbing center in the network environment of FIG. 1, according to one embodiment.

FIG. 2 is a block diagram of one of the scrubbing centers 108 according to one embodiment. The scrubbing center 108 may include, for example, one or more routers 200, one or more scrubbing devices 202, and a scrubbing controller 204. In examples, the scrubbing devices 202 and scrubbing controllers 204 may be implemented within routers 200. The scrubbing devices 202 may be configured to analyze a packet 206 received by one of the routers 200 and determine whether the packet is a malicious packet (e.g., part of a DDoS attack). In some examples, this may comprise one or more of the routers 200, scrubbing devices 202, and/or scrubbing controller 204 implementing mitigation rules provided by the threat intelligence system 110, such as implementing filters for packets having a particular threat profile. If the packet is deemed to be malicious, the packet may be dropped. However, if the packet is deemed to be clean, the packet may be forwarded to the target system 106.

The mechanism for forwarding the packet 206 to the target system 106 may depend on the configured return path. For example, if the return path is one of the dedicated encapsulation tunnels 112, the packet may be placed inside an encapsulating packet, and the encapsulation packet transmitted through the tunnel to a destination IP address of the target system 106 configured at scrubbing center 108. If the return path is the provider internet circuit 116, the packet is transmitted to the Internet circuit 116 for transmitting to the target system 106. In one embodiment, a routing table used by the router 200 identifies the return path based on the destination IP address in the received packet 206.

In one embodiment, the scrubbing controller 204 is configured to control the operation of the scrubbing devices 202. For example, when there are multiple routers 200 and/or scrubbing devices 202, the scrubbing controller 204 may select the particular router and/or scrubbing controller to use to provide the scrubbing services for the target system 106. The selection of the particular router and/or scrubbing controller may be automatic, based on capacity of the router 200, load balancing considerations of the scrubbing devices 202, and/or the like.

In one embodiment, the scrubbing controller 204 is configured to dynamically identify available capacity of the one or more routers 200 to determine the maximum size of the encapsulation tunnel 112 that may be configured for a particular customer. The available capacity may be identified in response to a query from the control center 118. In examples, a separate scrubbing controller 204 may be provided in each scrubbing center 108. In other examples, a scrubbing controller 204 may be located in a central location and/or scrubbing controller 204 may calculate the available capacity for, and control scrubbing devices 202 in, more than one scrubbing center 108.

In one embodiment, the scrubbing controller 204 identifies the available capacity based on the capacity of a network card in the router 200, a number of existing encapsulation tunnels 112 already configured on the network card, and predicted usage of the existing encapsulation tunnels. For example, if the maximum capacity of the network card is 10 Gbps, and there are already two customers for which an encapsulation tunnel 112 with a size/bandwidth of 2 Gbps has been configured on the router, the available capacity may initially be identified to be 6 Gbps. However, analysis of the usage data for the two customers may reveal that each of the tunnels is utilized only 50% of the time, and further, that the usage of the tunnels by the two customers do not overlap. In this case, the total available capacity may be calculated to be 8 Gbps based on the predicted 50% usage of the existing tunnels.

In one embodiment, the various scrubbing centers 108 are virtual machines or other hardware abstracted software installed in one or more pieces of equipment of the provider network, such as, for example, on one or more PE routers 100. According to this embodiment, one virtual scrubbing center may share capacity with another virtual scrubbing center. Thus, in computing the capacity of a particular virtual scrubbing center, the capacity of other virtual scrubbing centers may be taken into account.

Figure 3:
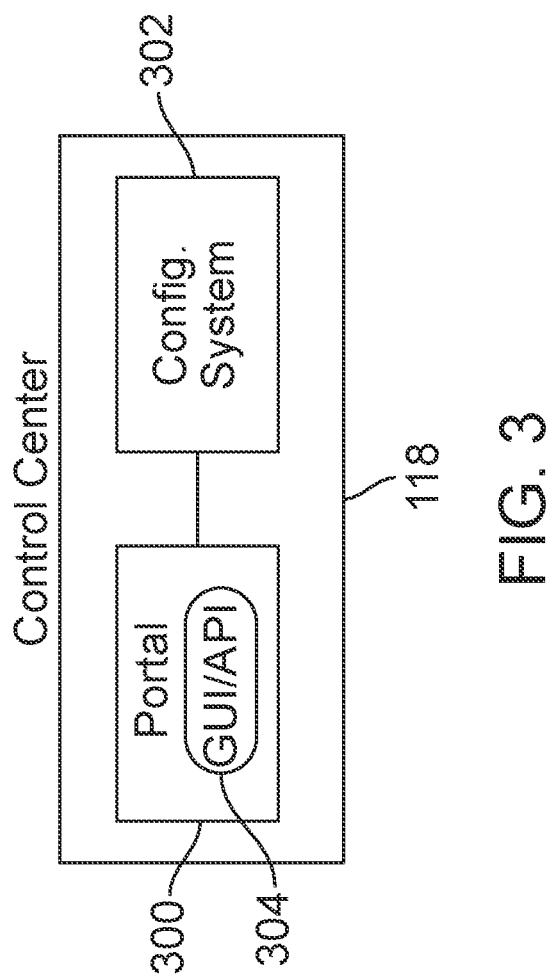
FIG. 3 is a block diagram of a control center in the network environment of FIG. 1, according to one embodiment.

FIG. 3 is a block diagram of the control center 118 according to one embodiment. The control center 118 may include a portal server 300 and a configuration system 302. The portal server 300 may be a web server that serves a GUI or an API 304 that a target administrator may access using a client device to purchase, configure, and/or manage threat mitigation services for the target system 106. The access of the portal server 300 may be via the Internet 104 using, for example, a web browser or an API. For example, the target administrator may define, via interactions with the GUI 304, various configuration parameters of the threat mitigation service, including, for example, the IP addresses/prefixes of the target system 106 to be protected, the scrubbing center 108 to be used, the return path for returning clean traffic, and/or the bandwidth of the return path.

In one embodiment, the portal server 300 provides the user-input configuration parameters to the configuration system 302. The configuration system 302 may comprise one or more servers and associated databases storing customer data. The customer data may include, for example, the Internet circuits 116 associated with the customer, scrubbing centers 108 providing scrubbing services for the customer, IP addresses/prefixes protected via the threat mitigation services, and/or the like. In one embodiment, the customer data is stored in association with a customer identifier (ID).

In one embodiment, the customer accesses the portal server 300 to configure threat mitigation services for the target system 106. One of the configuration parameters may be the return path to use to forward clean packets directed to the target system 106. The return path may be either via an encapsulation tunnel 112 or a provider Internet circuit 116. In response to receiving indication that the Internet circuit 116 is to be used as the return path, the configuration system 302 dynamically checks for compatible Internet circuits for the customer that may be used as the return path. In this regard, the configuration system 302 may retrieve from the one or more customer databases, all the Internet circuits of the provider subscribed to by the customer, based on the customer ID. In some embodiments, the configuration system 302 may only display the subscribed Internet circuits that qualify to be used as the return path.

In one embodiment, the configuration system 302 applies one or more rules/filters for identifying the Internet circuits 116 that qualify to be used as the return path. For example, the rules may check whether a network identifier for the Internet circuit 116 is included in a list of authorized network identifiers, and/or whether the type of router(s) used by the circuit is included in a list of authorized routers. The rules may also check the routing protocol used by the Internet circuit 116 (e.g., BGP or static routing) to ensure that the routing protocol is an authorized routing protocol. The rules may further check the type of address space configured to ensure that it is an authorized address space (e.g., IPv4). One or more rules may also check the type of equipment (e.g., routers) on the target system 106 that are associated with that provider Internet circuit against a list of compatible equipment.

In response to receiving selection of one of the qualified Internet circuits, the configuration system 302 may identify technical information required to provision threat mitigation services for the selected Internet circuit 116. The identified technical information may include the bandwidth size of the Internet circuit 116, advertised IP address space, the permitted size of blocks to be advertised (e.g., exact, smaller than, or larger than), and the type of advertising (e.g., BGP or static).

In one embodiment, the GUI 304 displays the advertised IP address space for prompting the administrator to select all or a subset of the address space to protect via the threat mitigation services. The selected address space may then be provided to the scrubbing center 108 and/or threat intelligence service 110 for protection. In one embodiment, the scrubbing center 108 forwards clean packets directed to the protected IP addresses, using the selected Internet circuit 116. The bandwidth used for the forwarding may be limited based on the return traffic bandwidth specified by the administrator.

In one embodiment, the configuration system 302 may further automatically transmit a message to the target system 106 of actions to be taken by the target router 107 to use the selected Internet circuit 116 as the return path. For example, if the target router 107 uses BGP to advertise its routing information, the message may instruct the target router 107 to establish a BGP session and attach a BGP community (e.g., 202:202) to the desired IP prefixes to allow packets with the IP prefixes to be transmitted via the selected Internet circuit 116. In one embodiment, the target router 107 automatically establishes the BGP session and attaches the BGP community to the relevant IP prefixes, in response to the message.

In one embodiment, the customer identifies the encapsulation tunnel 112 as the return path. In this regard, the GUI 304 provides a list of scrubbing center locations where the encapsulation tunnel may originate. The scrubbing controller 204 in each of the scrubbing centers 108 may dynamically compute the capacity of the one or more routers 200 that may be available to be used for an encapsulation tunnel, in response to one or more queries from the control center 118. In this regard, the GUI 304 may provide a tunnel size option, with the maximum size being no larger than the dynamically computed capacity. In response to the administrator selecting a tunnel size, the configuration system 302 transmits a signaling message to the selected scrubbing center 108 for automatically setting up an encapsulation tunnel of a selected tunnel size, for the customer, with a source end of the tunnel originating from the selected scrubbing center. In one embodiment, the configuration system 302 also transmits instructions to the target router 107 of the target system 106 for setting up a destination end of the tunnel. In one embodiment, the instructions are executable upon receipt by the target router 107 for automatically setting up the tunnel.

Figure 6:
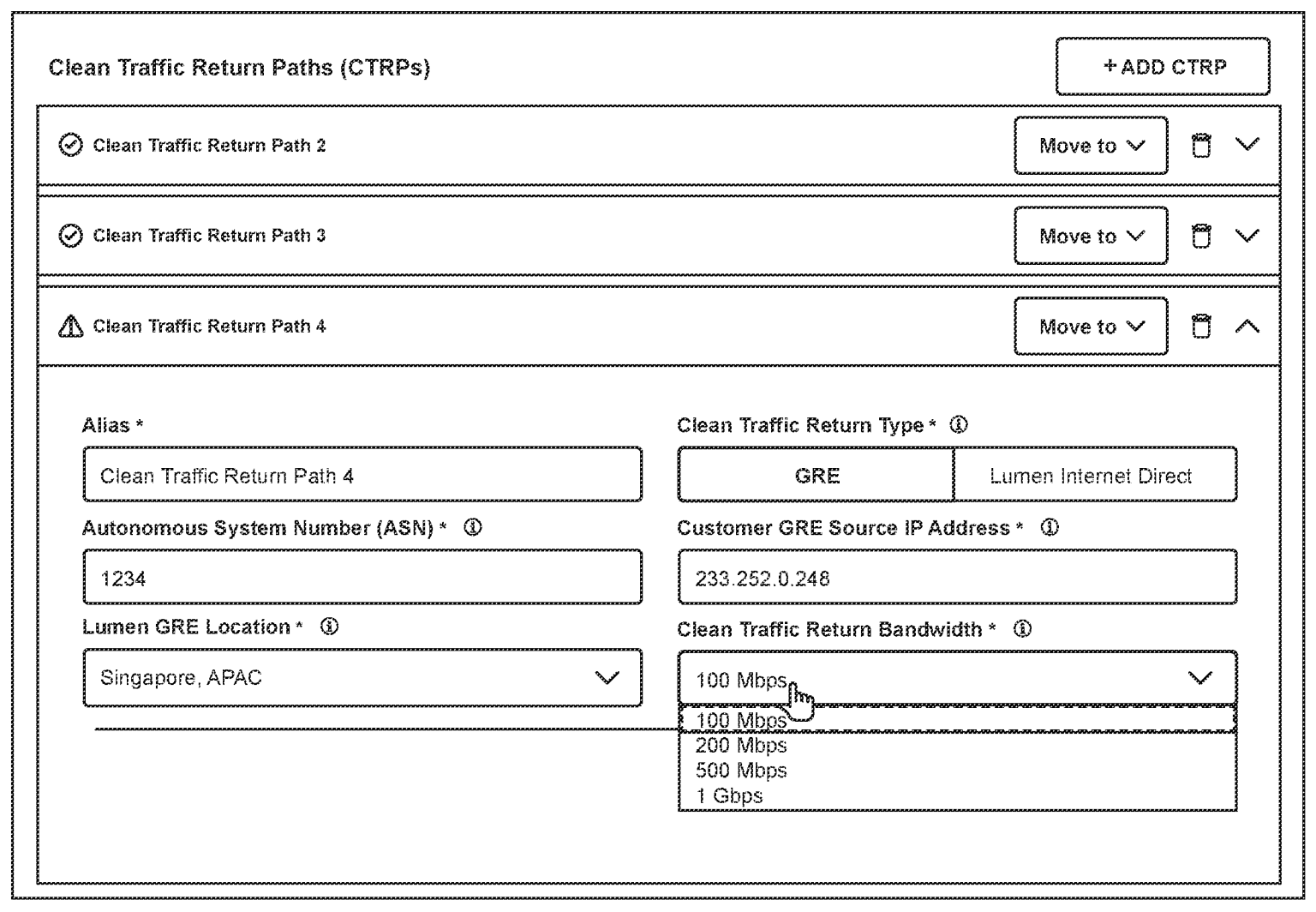

FIGS. 4-6 are example display screens generated by the GUI 304 providing options for setting up the return path for forwarding clean packets to the target system 106 according to one embodiment. In one embodiment, the GUI 304 allows the administrator to select either an encapsulation tunnel option 400 or a provider circuit option 402 as the return path type. In response to receiving a selection of the encapsulation tunnel option 400, the control center 118 transmits a query to the scrubbing controller 204 of one or more scrubbing centers 108. In response to the query, the scrubbing controller 204 dynamically computes the available capacity, and returns the computed capacity to be displayed via the GUI 304.

In one embodiment, locations of the scrubbing centers 108, where the encapsulation tunnel may originate, are displayed in a drop-down location menu 404. In response to receiving selection of a particular location 406 (e.g., Washington D.C.) from the menu 404, the GUI 304 displays or provides via an API response one or more available bandwidths 500 (FIG. 5) for the encapsulation tunnel from that selected location.

In one embodiment, the dynamically computed capacity is displayed as a maximum bandwidth 502 (e.g., 2 Gbps). The dynamically computed capacity may differ based on the selected location of the scrubbing center 108. For example, in the example of FIG. 6, the maximum capacity displayed for Singapore, based on the capacity dynamically computed by the scrubbing controller 204 for the Singapore scrubbing center 108, is 1 Gbps.

Once a desired scrubbing location and the desired capacity of the encapsulation tunnel are selected (e.g., by an administrator through GUI 304), a submit option 504 may be selected for automatically creating the tunnel. In one embodiment, the scrubbing controller 204 and/or router 200 of the selected scrubbing center 108 automatically (e.g., without manual intervention) configures the router 200 and creates a tunnel interface. In this regard, the scrubbing controller 204 and/or router 200 may configure the BGP parameters and IP address of the tunnel interface. In addition, the scrubbing controller 204 and/or router 200 may configure the tunnel source IP address and the tunnel destination IP address based on the information provided by an administrator (e.g., through GUI 304).

In one embodiment, the configuring of the target router 107 that is to receive clean packets via the encapsulation tunnel also occurs automatically (e.g., without manual intervention from an administrator of the target system 106). In one embodiment, the scrubbing controller 204 transmits a configuration message to the target router 107 with instructions for configuring the target router 107. The configuration message may include the target router's BGP IP address for the tunnel interface, and further include the tunnel source IP address and the tunnel destination IP address 706. In response to receipt of the message, the target router 107 may be configured to automatically set up the tunnel interface. For example, the message may comprise an auto-executing script to configure the target router 107 with the necessary configuration information for the tunnel, as described above.

Figure 7:
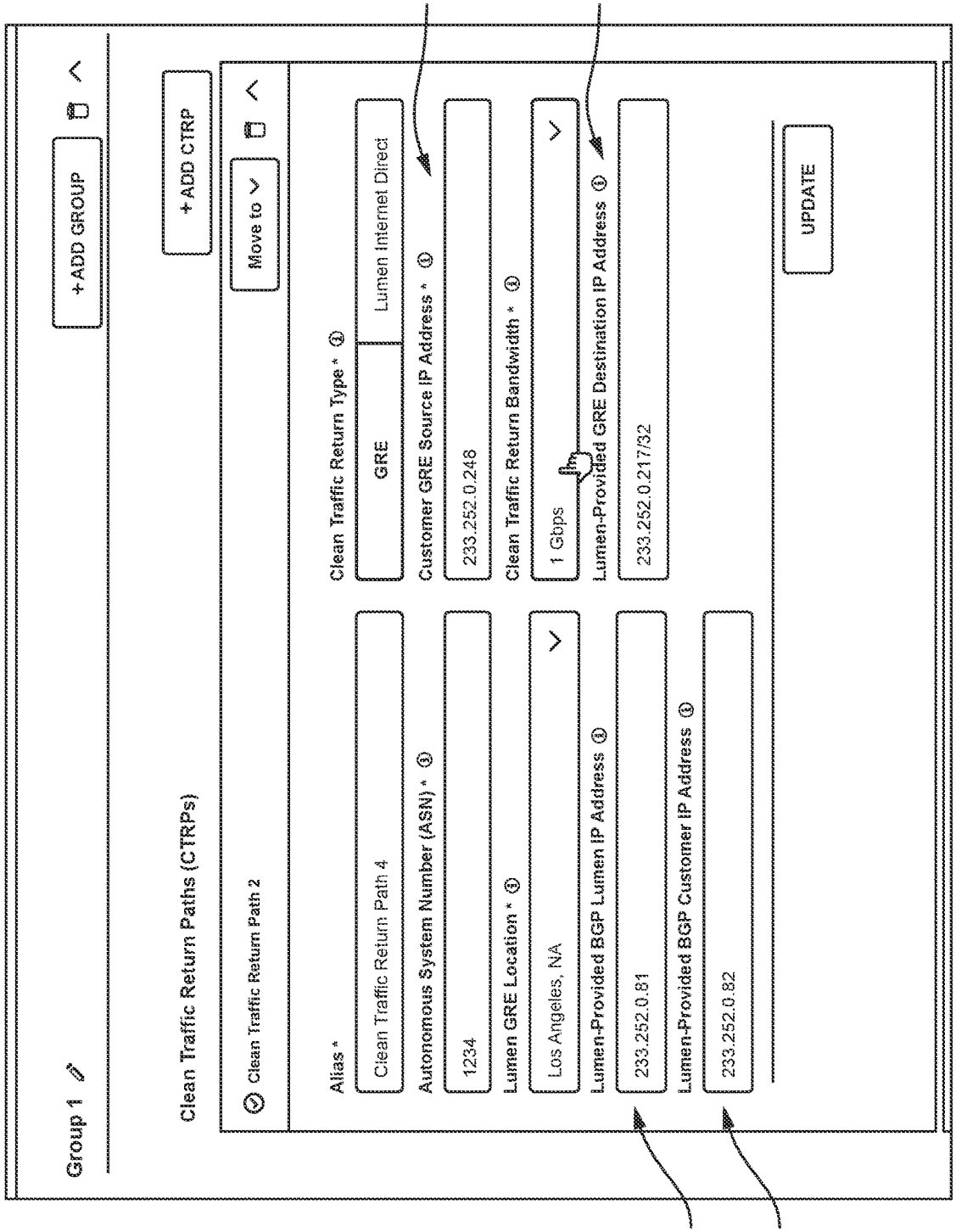
FIG. 7 depicts a graphical user interface displaying configuration data of an encapsulation tunnel according to one embodiment.
Figure 11:
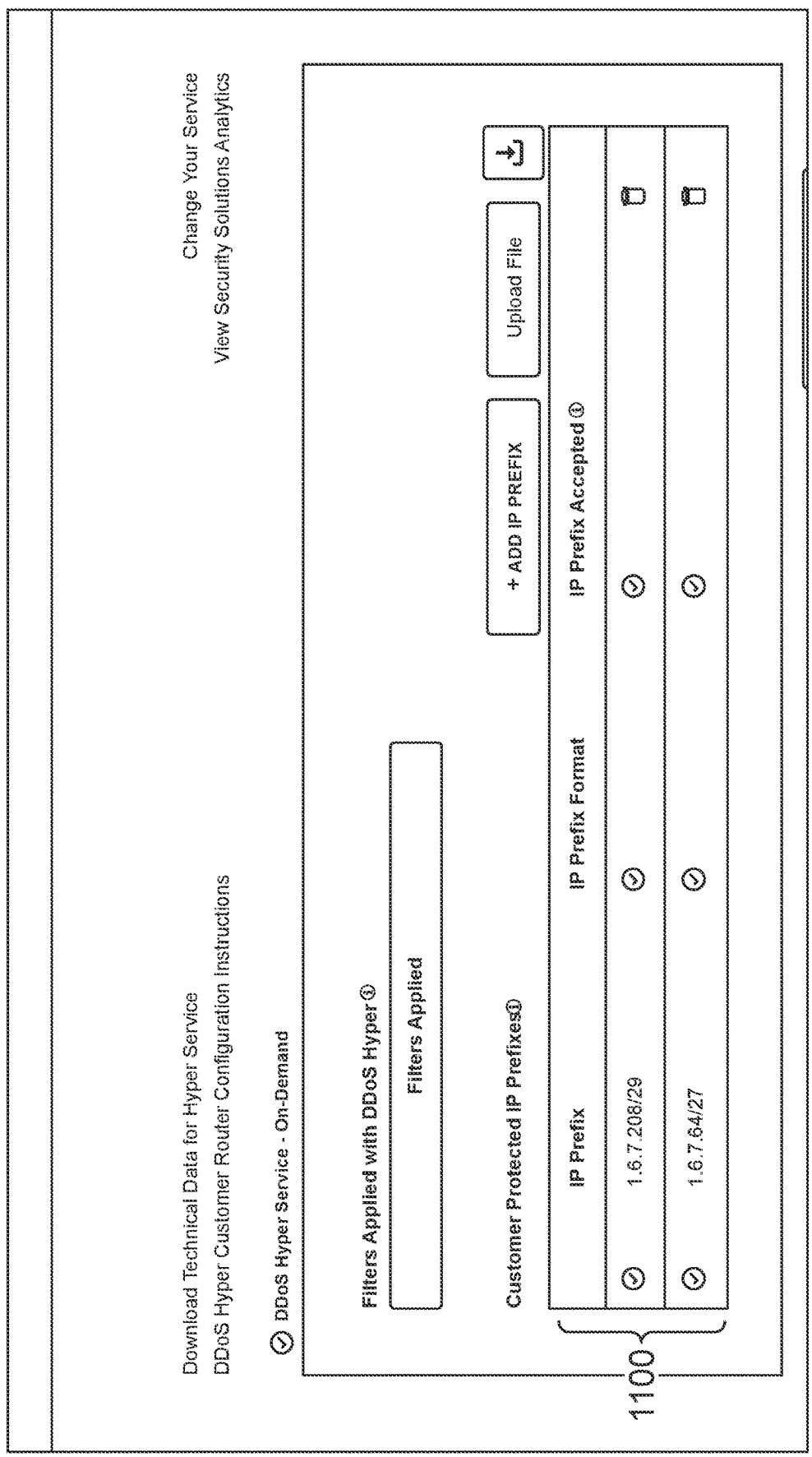

FIG. 7 is an example display screen of configuration data of an encapsulation tunnel according to one embodiment. In the example of FIG. 7, the encapsulation tunnel originates from Los Angeles and has a capacity of 1 Gbps. The GUI 304 retrieves and causes display of the BGP IP address 700 of the tunnel at the router 200 in the Los Angeles scrubbing center 108, the BGP IP address 702 of the tunnel at the target router 107 of the target system 106, the tunnel source IP address 704, and the tunnel destination IP address 706.

FIGS. 8-11 depict example display screens generated by the GUI 304 for allowing configuration of threat mitigation services in response to receiving selection of the provider Internet circuit option 402 via GUI 304, according to one embodiment. In response to selection of the provider Internet circuit option 402, the GUI 304 may cause display of a list of Internet circuits 800 subscribed to by the customer. In one embodiment, the list of Internet circuits 800 are unfiltered circuits that have not yet been processed using rules/filters for determining whether the circuits are appropriate to use as the return path. For example, in order to maximize speed of display, all Internet circuits associated with the customer are displayed, regardless of whether they are qualified to operate a return path for clean traffic. In other examples, the list of Internet circuits 800 includes only the filtered circuits that are qualified to operate as a return path for clean traffic. In examples, a customer ID is used to identify Internet circuits that the customer subscribes to for the provider. For example, the customer ID may be entered (or looked up) as part of a sign-on or API authentication procedure for accessing control center 118.

In the embodiment where the list of Internet circuits 800 comprises the unfiltered circuits, selection of a particular circuit 900 (FIG. 9) invokes the configuration system 302 to check whether the circuit is qualified. If the circuit is not qualified, a message is displayed to the administrator that the circuit is not qualified. The message may provide the reasons as to why the circuit does not qualify. In one embodiment, when no qualified Internet circuits are available, the GUI 304 may indicate that only the encapsulation tunnel 112 is feasible as the return path and prompt the customer to set up the encapsulation tunnel. In other examples, the GUI 304 may present an interface for the customer to order a new, qualifying Internet circuit for this purpose.

If the selected Internet circuit 116 qualifies, the configuration system 302 retrieves the characteristics of the selected circuit for display via the GUI 304. As depicted in FIG. 10, the retrieved information may include, for example, the public IP address block assigned to the selected provider IP circuit 1000, routing protocol used 1002, and autonomous system number 1004.

In one embodiment, the GUI 304 provides an option for specifying (e.g., through selection of an item in a drop-down list) a clean traffic return bandwidth 1006. In response to the selection, the router 200 of the scrubbing center 108 may be configured to use up to the selected bandwidth in forwarding clean packets to the target system 106 via the selected provider IP circuit.

In one embodiment, the GUI 304 provides a peer prefix option 1008 which, upon selection, causes display of the peer prefixes of the Internet circuit 116 that have not been protected via the provider's threat mitigation services. One or more of the displayed IP prefixes may be selected to be added into a list of protected IP prefixes 1100 for the customer.

Figure 12:
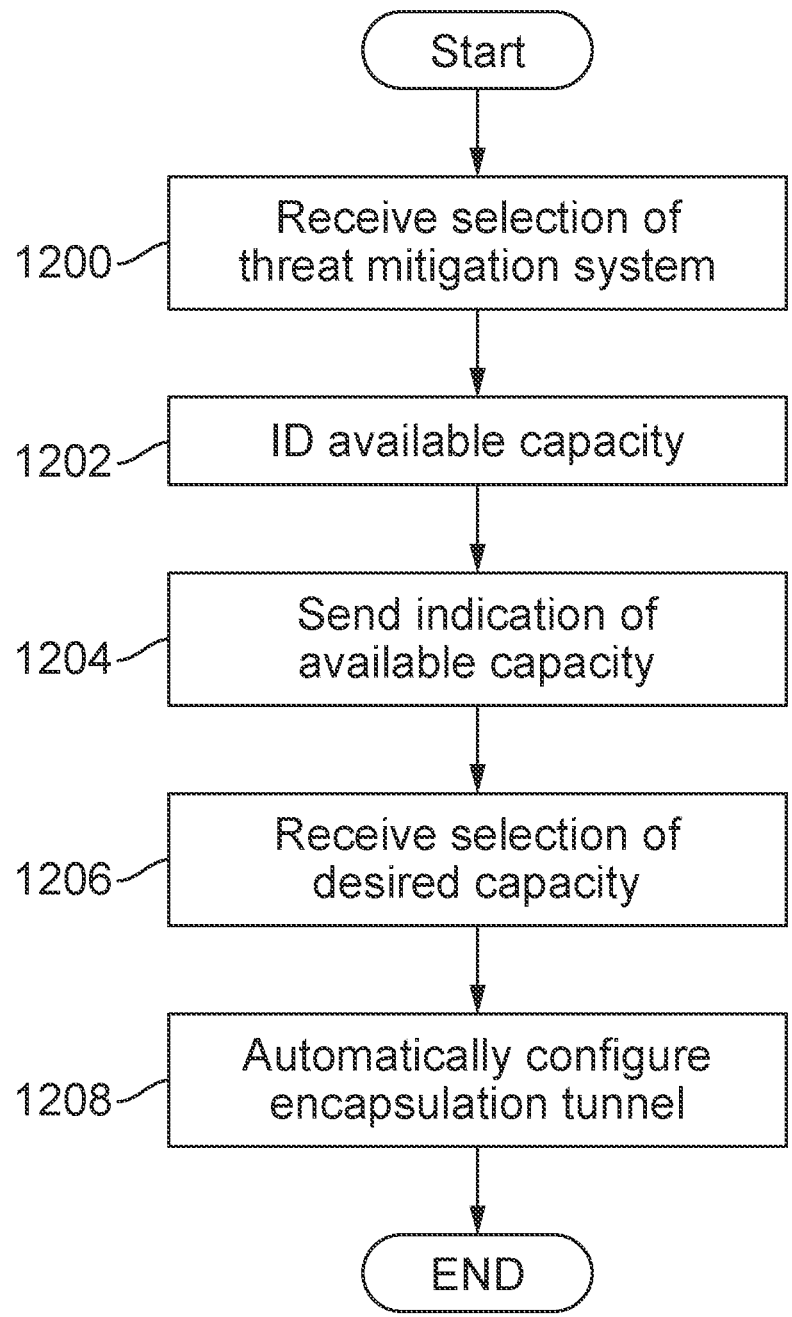
FIG. 12 is a flow diagram of a process for configuring threat mitigation services to use an encapsulation tunnel to forward clean network packets according to one embodiment.

FIG. 12 is a flow diagram of a process for configuring threat mitigation services to use an encapsulation tunnel to forward clean network packets according to one embodiment. The process starts, and in act 1200, a selection may be received indicating that a customer desires to implement threat mitigation for a particular target system of the customer. For example, the control center 118 may receive, from a computing device controlled by a target-service administrator, a selection indicating the administrator desires to activate threat mitigation for the target system 106. In one embodiment, the configuration system 302 may automatically recommend an optimal scrubbing center 108 for being selected by the administrator. The recommendation may be, for example, based on geographic proximity or latency between the scrubbing centers 108 and the target system 106. In other examples, the administrator may select a desired scrubbing center 108 from a list of options provided via GUI 304.

In act 1202, capacity of at least one scrubbing center 108 is determined. For example, the scrubbing controller 204 may dynamically identify the available capacity of the selected scrubbing center 108 to deliver traffic to the target system 106. In other examples, operation 1202 may occur prior to the selection of a particular scrubbing center—e.g., operation 1202 may determine available capacity for multiple scrubbing centers 108 that are presented for selection (along with available capacity) at operation 1200.

In act 1204, an indication of the available capacity is provided. For example, the available capacity at one or more of the scrubbing center(s) 108 determined at operation 1202 may be provided for presentation through the GUI 304. The determination of capacity may be in response to a query from the configuration system 302. In one embodiment, the determined capacity includes or be based upon maximum bandwidth of a network card of a router in the scrubbing center 108, a number of existing encapsulation tunnels configured on the network card, and/or predicted usage of the existing encapsulation tunnels. In one embodiment, in predicting usage of existing encapsulation tunnels, the scrubbing controller 204 may determine trend of usage (e.g., amount of usage, times of usage, etc.) from historical data, and/or the like.

As discussed, in one embodiment, the configuration system 302 transmits the query for available capacity to all the various scrubbing centers 108, instead of just a selected scrubbing center, when the administrator first accesses the portal server 300. Having such information at hand may allow the GUI 304 to quickly cause display of the maximum capacity for an encapsulation tunnel originating from the different scrubbing centers 108, as the scrubbing centers 108 are displayed for selection in a drop-down menu (e.g., drop-down menu 404).

In act 1206, a selection of a desired capacity is received. For example, the administrator may interact with the GUI 304 to view different capacity options for configuring the encapsulation tunnel 112 and may select a desired capacity from the different capacity options. In examples, the different capacity options may range from 100 Mbps up to the calculated maximum capacity.

In act 1208, an encapsulation tunnel is automatically configured. For example, the configuration system 302 may transmit messages for automatically configuring an encapsulation tunnel 112 of the selected capacity, where the tunnel originates from a router (e.g., router 200) of the selected scrubbing center 108, and ends at a router (e.g., target router 107) of the target system 106. If there are multiple routers at a particular scrubbing center, the configuration system 302 and/or scrubbing controller 204 may select one of the routers based on, for example, available capacity.

In one embodiment, the configuration system 302 automatically configures the router 200 of the selected scrubbing center 108 with the IP address of the tunnel interface, the tunnel source IP address, and the tunnel destination IP address. In one embodiment, the configuration system 302 transmits a first signaling message to the target router 107 of the target system 106 with instructions to automatically configure the tunnel at the router. For example, the first signaling message may include the target router's IP address for the tunnel interface, the tunnel source IP address, the tunnel destination IP address, and BGP parameters. The target router 107 of the target system 106 may be configured to execute the instructions (e.g., a script) to automatically configure the tunnel at the target router.

In some embodiments, a selection of a second threat mitigation system that includes the scrubbing center 108 is received. A router of the second threat mitigation system may be configured concurrently with the configuring of the router of the first threat mitigation system. This may entail, for example, configuring the router of the second threat mitigation system with an IP address of the target router 107 at the target system.

Figure 13:
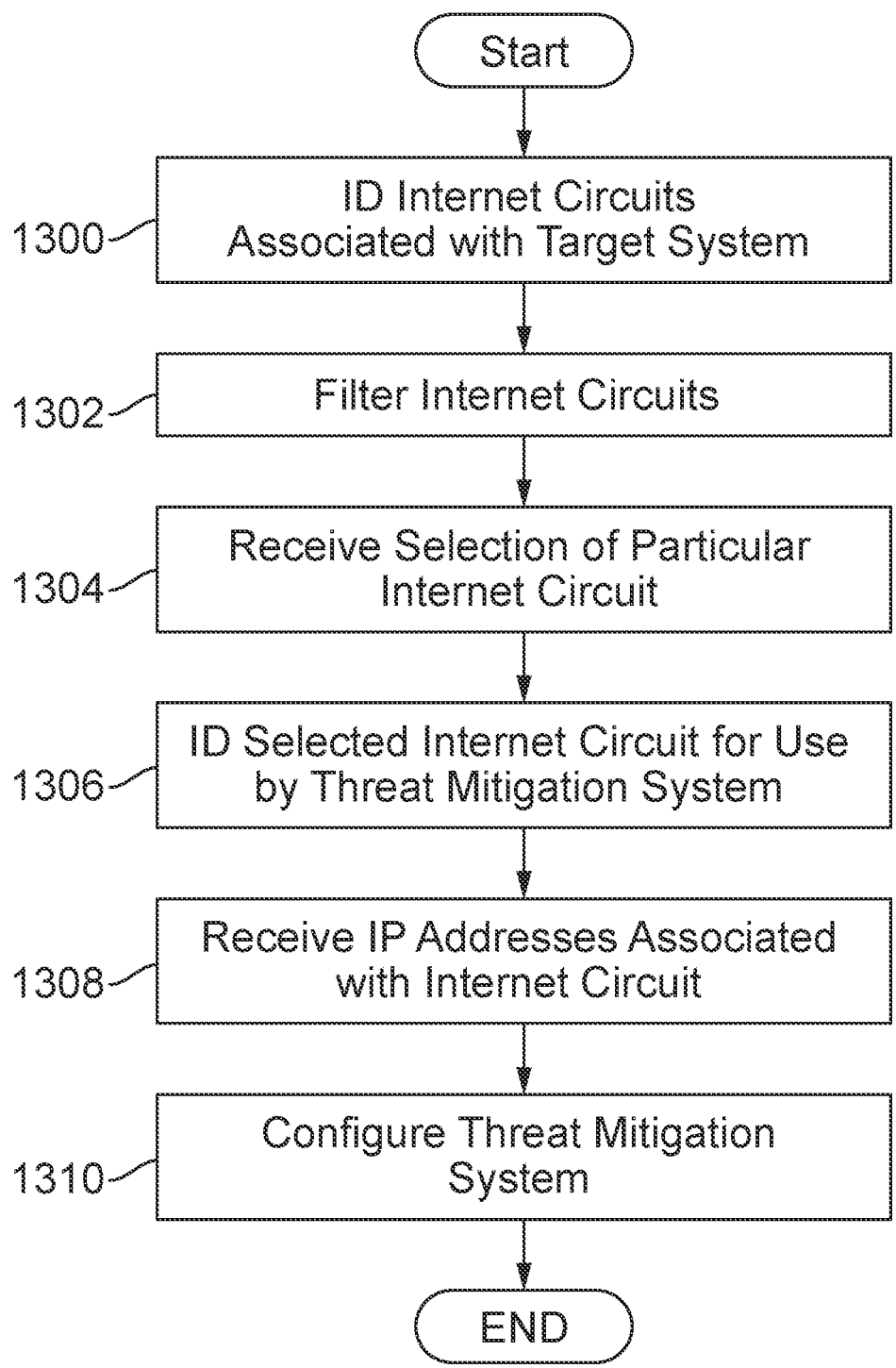
FIG. 13 is a flow diagram of a process for configuring threat mitigation services to use a provider Internet circuit to forward clean network packets according to one embodiment.

In one embodiment, a second signaling message may be transmitted to the target router 107, concurrently with the first signaling message. The second signaling message may include the IP address of the router of the second threat mitigation system, and instructions (e.g., a script) for configuring a second encapsulation tunnel at the target router 107, FIG. 13 is a flow diagram of a process for configuring threat mitigation services to use a provider Internet circuit to forward clean network packets according to one embodiment. The process starts, and in act 1300, Internet circuits associated with the target system 106 are identified. For example, the configuration system 302 may identify one or more Internet circuits 116 associated with the target system 106. The identification of the one or more Internet circuits 116 may be in response to a request from the administrator for threat mitigation services. In one embodiment, the configuration system 302 retrieves information of the Internet circuits 116 subscribed to by the target system 106 and provides the retrieved information for display via the GUI 304 at a computing device. One or more of the Internet circuits 116 may be used by the target system 106 for providing services over the Internet.

In act 1302, identified Internet circuits are filtered. For example, the configuration system 302 may automatically filter the one or more Internet circuits 116 based on at least one qualification criterion to determine Internet circuits 116 that are qualified to carry the return clean traffic. The qualification criterion may be, for example, an Internet circuit type, a type of equipment used by the Internet circuit, a type of routing protocol used by the Internet circuit, or a type of equipment of the target system 106 that uses the Internet circuit.

In act 1304, a selection of a particular Internet circuit is received for use by the threat mitigation service. For example, selection of a particular Internet circuit 116 may be received through GUI 304 or an API response from the administrator of the target system 106.

In act 1306, at least one Internet protocol (IP) address associated with the Internet circuit is received. For example, the configuration system 302 may receive an identification of one or more IP addresses (e.g., address prefixes) associated with the selected Internet circuit 116 for being protected by the threat mitigation system. In examples, the IP addresses may comprise all IP addresses currently associated with the selected Internet circuit. In other examples, only a subset of IP addresses currently associated with selected Internet circuit are selected for threat mitigation. In this regard, the GUI 304 may cause display of a list of unprotected IP addresses associated with the selected Internet circuit and prompt the administrator to select one or more of the IP addresses for being added into a list of protected IP addresses.

In act 1308, the threat mitigation system is automatically configured. For example, the configuration system 302 automatically configures the threat mitigation system based on the selected IP addresses and the selected Internet circuit 116. In one embodiment, the automatic configuration includes configuring a router of the threat mitigation system to send clean packets to the target system via the selected Internet circuit. The automatic configuration may also include setting an upper bandwidth limit to be used to forward the clean packets via the Internet circuit. The upper bandwidth limit may be set by the administrator, e.g., through GUI 304.

Figure 14:
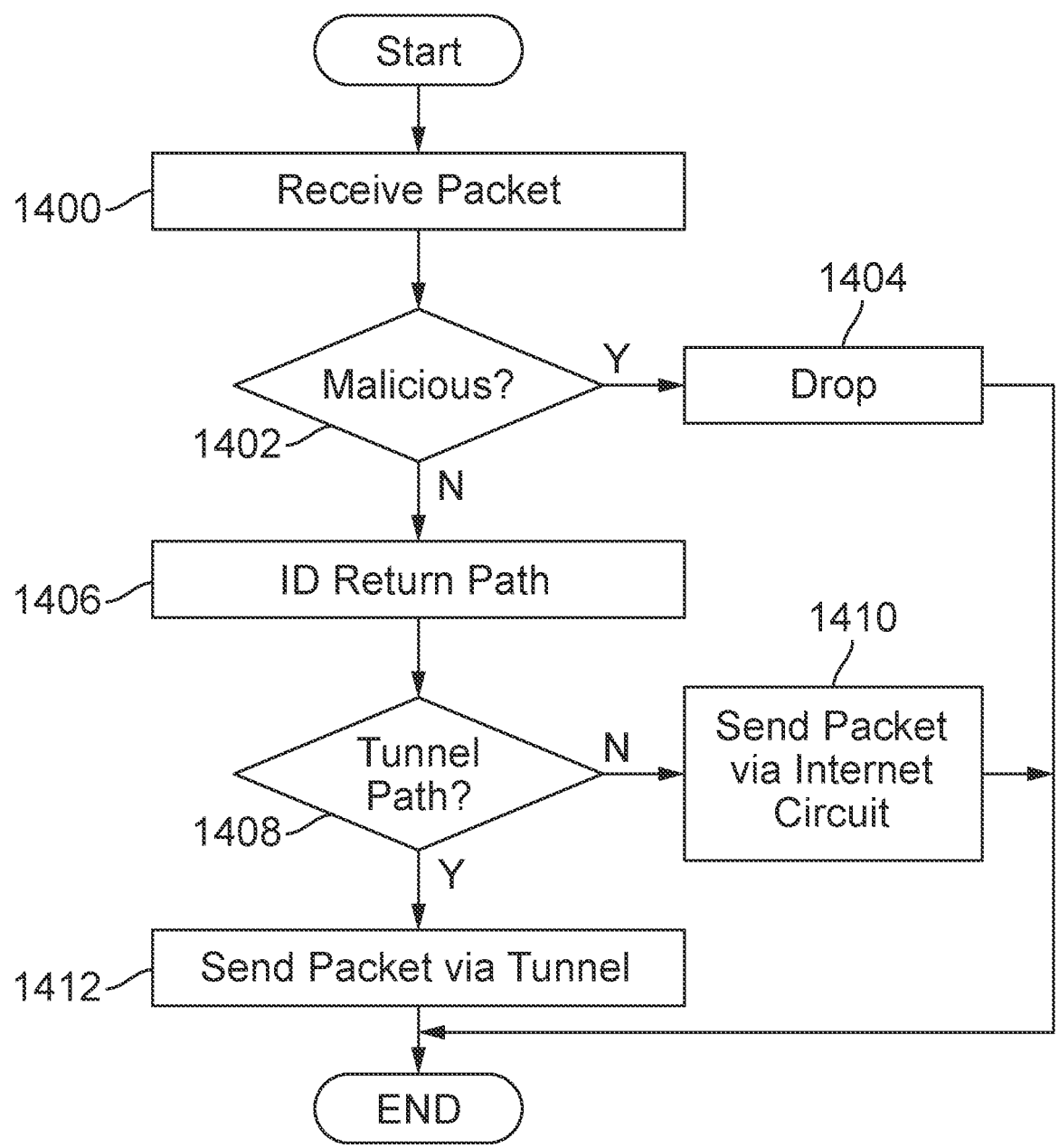
FIG. 14 is a block diagram of a process for providing threat mitigation services according to one embodiment.

FIG. 14 is a block diagram of a process for providing threat mitigation services according to one embodiment. The process starts, and at act 1400, a packet is received. For example, the scrubbing center 108 configured for the target system 106 may receive a network packet that is directed to the target system 106. The network packet 206 may be rerouted to the scrubbing center 108 in response to threat mitigation for the target system 106 being activated. In examples, threat mitigation may be activated when the threat intelligence service 110 determines that traffic being received at the target system 106 meets a threat profile. The threat profile may be, for example, a sudden increase in queries received at the target system 106 from a particular source IP address, queries having unusual headers or payloads, etc. In examples, when the threat intelligence service 110 detects a threat, it may automatically turn on threat mitigation and cause traffic for the target system 106 to be rerouted to a scrubbing center 108. In other examples, the threat intelligence service 110 may provide notification of the threat, and an administrator may selectively enable threat mitigation for the target system at a particular scrubbing center 108 (e.g., as discussed above). In one embodiment the rerouting is through a BGP advertisement/announcement that includes route information to redirect the public traffic 102 intended for the target system 106, to the scrubbing center 108.

In act 1402, a determination is made whether the packet is malicious. For example, the scrubbing center 108 may determine whether the network packet is malicious by implementing filters and rules provided by the threat intelligence system 110 to mitigate the detected threat. If the packet is deemed to be malicious, the packet may be dropped at act 1404. For example, the scrubbing center 108 drops the packet. In other examples, the malicious packet may be redirected to a different destination (e.g., an attack packet capture storage) or otherwise diverted from the target system 106.

If the packet is not deemed to be malicious, a return path is determined. For example, the scrubbing center 108 may identify the return path for forwarding the packet to the target system 106. In this regard, the router 200 at the scrubbing center 108 may examine the destination IP address of the packet to determine the interface on which the packet is to be sent. The router 200 may use a routing table to make this determination.

In act 1408, the packet is returned via the identified return path. For example, if the path identified at operation 1406 is a provider internet circuit 116, the packet is returned via the provider Internet circuit 116 using a route in the routing table. If the return path identified at operation 1406 is an encapsulation tunnel, the packet is returned using the encapsulation tunnel configured in the router 200. In this regard, the router 200 places the network packet inside an encapsulating packet. The header information for the encapsulating packet specifies the tunnel source IP address and the tunnel destination IP address as the endpoints of the tunnel. The packet is then transmitted to the tunnel destination IP address, e.g., using a tunnel across network 114.

In the embodiment where the scrubbing centers 108 are virtual machines, the tunnel in one of the virtual machines may be selected (e.g., by the scrubbing controller 204) for forwarding the network packet. The selection of virtual machine may be dynamic based on the ability to meet the bandwidth requirements of the customer.

In one embodiment, upon receipt of the encapsulation packet by the target router 107, the target router decapsulates the received packet to retrieve the network packet and routes the network packet to the intended destination of the target system 106.

FIG. 15 is a block diagram of a computing device 1500 according to an example. The computing device 1500, or various components and systems of the computing device 1500, may be integrated or associated with the target system 106, scrubbing center 108, threat intelligence service 110, and/or threat intelligence service 110. As shown in FIG. 15, the physical components (e.g., hardware) of the computing device are illustrated and these physical components may be used to practice the various aspects of the present disclosure. For example, the scrubbing device 202, scrubbing controller 204, portal server 300, and/or configuration system 302 may be implemented via one or more computing devices 1500.

The computing device 1500 may include at least one processing unit 1510 and a system memory 1520. The system memory 1520 may include, but is not limited to, volatile storage (e.g., random access memory), non-volatile storage (e.g., read-only memory), flash memory, or any combination of such memories. The system memory 1520 may also include an operating system 1530 that controls the operation of the computing device 1500 and one or more program modules 1540. The program modules 1540 may be responsible for gathering or determining event data 1550 including endpoint data and/or network data. A number of different program modules and data files may be stored in the system memory 1520. While executing on the processing unit 1510, the program modules 1540 may perform the various processes described above.

The computing device 1500 may also have additional features or functionality. For example, the computing device 1500 may include additional data storage devices (e.g., removable and/or non-removable storage devices) such as, for example, magnetic disks, optical disks, or tape. These additional storage devices are labeled as a removable storage 1560 and a non-removable storage 1570.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 1500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 1500 may include one or more communication systems 1580 that enable the computing device 1500 to communicate with other computing devices 1595 such as, for example, servers, routers, network devices, client computing devices, etc. Examples of communication systems 1580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 1500 may also have one or more input devices and/or one or more output devices shown as input/output devices 1590. These input/output devices 590 may include a keyboard, a sound or voice input device, haptic devices, a touch, force and/or swipe input device, a display, speakers, etc. The aforementioned devices are examples and others may be used.

The term computer-readable media as used herein may include non-transitory computer storage media. Computer storage media may include volatile and nonvolatile, removable and non-removable media implemented in any method or technology for storage of information, such as computer readable instructions, data structures, or program modules.

The system memory 1520, the removable storage 1560, and the non-removable storage 1570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1500. Any such computer storage media may be part of the computing device 1500. Computer storage media is tangible and non-transitory and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

In regards to the processes in the flow diagrams of FIGS. 12-14, it should be understood that the sequence of steps of the processes are not fixed, but can be modified, changed in order, performed differently, performed sequentially, concurrently, or simultaneously, or altered into any desired sequence, as recognized by a person of skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure." Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for configuring and using threat mitigation services have been specifically described and illustrated herein, many modifications and variations will be apparent to those skilled in the art. Accordingly, it is to be understood that the systems and methods for configuring and using threat mitigation services constructed according to principles of this disclosure may be embodied other than as specifically described herein. The disclosure is also defined in the following claims, and equivalents thereof.

What is claimed is:

1. A method for mitigating threats in a network, comprising:
   receiving, from a computing device, a first selection of a first threat mitigation system for protecting a target service;
   dynamically identifying available capacity of the threat mitigation system to deliver traffic to the target service;
   sending an indication of the available capacity to the computing device;
   receiving, from the computing device, a second selection of a desired capacity of the threat mitigation system; and
   automatically configuring, in response to the second selection, a first encapsulation tunnel for transmitting packets to the target service based on the desired capacity,
   wherein identifying the available capacity comprises:
      automatically determining, from a plurality of scrubbing centers of the threat mitigation system, an optimal scrubbing center for the target service based on at least one of geographic proximity or latency between the plurality of scrubbing centers and the target service; and
      automatically determining existing routers in at least the optimal scrubbing center of the threat mitigation system, wherein the first router is one of the existing routers.

2. The method of claim 1, wherein the identifying the available capacity includes determining bandwidth of a network card in a first router of the first threat mitigation system.

3. The method of claim 2, wherein the identifying the available capacity includes identifying a number of existing encapsulation tunnels configured on the network interface card.

4. The method of claim 3, wherein the identifying the available capacity includes predicting usage of the existing encapsulation tunnels.

5. The method of claim 1, wherein the automatically configuring includes:
   configuring a router of the first threat mitigation system with an internet protocol (IP) address of a router at the target service; and
   transmitting a first signaling message to a router of the target service including an IP address of the router of the first threat mitigation system and instructions for configuring the first encapsulation tunnel at the router of the target service.

6. The method of claim 5 further comprising:
   identifying a second threat mitigation system;
   concurrently with the configuring of the router of the first threat mitigation system, configuring a router of the second threat mitigation system with an internet protocol (IP) address of the router at the target service; and
   transmitting, concurrently with the first signaling message, a second signaling message to the router at the target service including routing parameters of the router of the second threat mitigation system and instructions for configuring a second encapsulation tunnel at the router of the target service.

7. The method of claim 1 further comprising:
   receiving, by the first threat mitigation system, instructions for packet filtering from a threat intelligence service;
   receiving, at the first threat mitigation system, a network packet directed to the target service;

determining, by the first threat mitigation system, whether to forward the network packet based on the instructions;
in response to a determination to forward the network packet based on the instructions, transmitting the packet via the first encapsulation tunnel to the target service.

8. The method of claim 1 further comprising:
wherein the available capacity comprises multiple available bandwidths, and wherein the second selection comprises one of the multiple available bandwidths.

9. A method for mitigating threats in a network, comprising:
causing display of a plurality of scrubbing centers of a threat mitigation system;
receiving, from a computing device, a first selection of a particular scrubbing center of the plurality of scrubbing centers for protecting a target service;
dynamically calculating available capacity of at least the particular scrubbing center to deliver traffic to the target service;
causing display of one or more bandwidth options for an encapsulation tunnel originating from the particular scrubbing center, wherein the one or more bandwidth options is at or below the available capacity;
receiving, from the computing device, a second selection of a desired bandwidth for the particular scrubbing center;
automatically configuring, in response to the second selection, a first encapsulation tunnel with the desired bandwidth for transmitting packets to the target service;
receiving, by the first scrubbing center a network packet directed to the target service;
determining, by the first scrubbing center, whether to forward the network packet to the target service; and
in response to determining to forward the network packet to the target service, transmitting the packet to the target service via the encapsulation tunnel,
wherein calculating the available capacity comprises:
automatically determining, from a plurality of scrubbing centers of the threat mitigation system, an optimal scrubbing center for the target service based on at least one of geographic proximity or latency between the plurality of scrubbing centers and the target service; and
determining existing routers in at least the optimal scrubbing center of the threat mitigation system, wherein the first router is one of the existing routers.

10. The method of claim 9, wherein dynamically calculating available capacity comprises determining bandwidth of a network card in a first router of the particular scrubbing center.

11. The method of claim 10, wherein dynamically calculating available capacity comprises identifying a number of existing encapsulation tunnels configured on the network interface card.

12. The method of claim 11, wherein dynamically calculating available capacity comprises includes predicting usage of the existing encapsulation tunnels.

13. A system for mitigating threats in a network, comprising:
at least one processor; and
memory, operatively connected to the at least one processor and storing instructions that, when executed by the at least one processor, cause the system to perform a method, the method comprising:
receiving, from a computing device, a first selection of a first threat mitigation system for protecting a target service;
dynamically identifying available capacity of the threat mitigation system to deliver traffic to the target service;
sending an indication of the available capacity to the computing device;
receiving, from the computing device, a second selection of a desired capacity of the first threat mitigation system; and
automatically configuring, in response to the second selection, a first encapsulation tunnel for transmitting packets to the target service based on the desired capacity,
wherein identifying the available capacity comprises:
automatically determining, from a plurality of scrubbing centers of the threat mitigation system, an optimal scrubbing center for the target service based on at least one of geographic proximity or latency between the plurality of scrubbing centers and the target service; and
automatically determining existing routers in at least the optimal scrubbing center of the threat mitigation system, wherein the first router is one of the existing routers.

14. The system of claim 13, wherein the identifying the available capacity includes determining bandwidth of a network card in a first router of the first threat mitigation system, identifying a number of existing encapsulation tunnels configured on the network interface card, and predicting usage of the existing encapsulation tunnels.

15. The system of claim 13, wherein the automatically configuring includes:
configuring a router of the first threat mitigation system with an internet protocol (IP) address of a router at the target service; and
transmitting a first signaling message to a router of the target service including an IP address of the router of the first threat mitigation system and instructions for configuring the first encapsulation tunnel at the router of the target service.

16. The system of claim 15, wherein the method further comprises:
identifying a second threat mitigation system;
concurrently with the configuring of the router of the first threat mitigation system, configuring a router of the second threat mitigation system with an internet protocol (IP) address of the router at the target service; and
transmitting, concurrently with the first signaling message, a second signaling message to the router at the target service including routing parameters of the router of the second threat mitigation system and instructions for configuring a second encapsulation tunnel at the router of the target service.

17. The system of claim 13, wherein the method further comprises:
receiving, by the first threat mitigation system, instructions for packet filtering from a threat intelligence service;
receiving, at the first threat mitigation system, a network packet directed to the target service;
determining, by the first threat mitigation system, whether to forward the network packet based on the instructions;

in response to a determination to forward the network packet based on the instructions, transmitting the packet via the first encapsulation tunnel to the target service.

18. The system of claim 13, wherein the method further comprises:
wherein the available capacity comprises multiple available bandwidths, and wherein the second selection comprises one of the multiple available bandwidths.

* * * * *